(12) United States Patent
Liang et al.

(10) Patent No.: US 8,787,224 B2
(45) Date of Patent: Jul. 22, 2014

(54) METHOD AND SYSTEM FOR ACKNOWLEDGMENT/NEGATIVE ACKNOWLEDGMENT FEEDBACK ON PHYSICAL UPLINK CONTROL CHANNEL

(75) Inventors: Chunli Liang, Shenzhen (CN); Bo Dai, Shenzhen (CN); Peng Hao, Shenzhen (CN); Yuqiang Zhang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 122 days.

(21) Appl. No.: 13/504,061

(22) PCT Filed: Feb. 11, 2011

(86) PCT No.: PCT/CN2011/070946
§ 371 (c)(1),
(2), (4) Date: Apr. 25, 2012

(87) PCT Pub. No.: WO2012/022140
PCT Pub. Date: Feb. 23, 2012

(65) Prior Publication Data
US 2012/0218881 A1 Aug. 30, 2012

(30) Foreign Application Priority Data
Aug. 16, 2010 (CN) .......................... 2010 1 0258749

(51) Int. Cl.
*H04B 7/00* (2006.01)
*H04L 1/18* (2006.01)
*H04L 1/16* (2006.01)

(52) U.S. Cl.
CPC ............ *H04L 1/1861* (2013.01); *H04L 1/1896* (2013.01); *H04L 1/1685* (2013.01)
USPC ....................................................... 370/310

(58) Field of Classification Search
CPC . H04W 28/04; H04W 72/042; H04W 52/325; H04W 24/10; H04L 5/001; H04L 1/1671; H04L 1/1861; H04L 5/0053; H04L 5/0055; H04L 1/1812; H04L 1/0026
USPC ................................................... 370/310–350
See application file for complete search history.

(56) References Cited

U.S. PATENT DOCUMENTS 8,514,883 B2 * 8/2013 Pan et al. ....................... 370/468
2010/0272048 A1 * 10/2010 Pan et al. ...................... 370/329
(Continued)

FOREIGN PATENT DOCUMENTS

| CN | 101588224 A | 11/2009 |
| CN | 101594209 A | 12/2009 |

(Continued)

OTHER PUBLICATIONS

Draft Report of 3GPP TSG RAN WG1 #61bis v0.1.0 (Dresden, Germany, Jun. 28-Jul. 2, 2010), Agenda Item 3, 3GPP TSG RAN WG1 Meeting #62, Madrid, Spain, Aug. 23-27, 2010, R1-10xxxx, 92 Pages.

*Primary Examiner* — Fan Ng
(74) *Attorney, Agent, or Firm* — Brooks Kushman P.C.

(57) ABSTRACT

The present invention discloses a method and system for feeding back an acknowledgement/negative-acknowledgement response message on a physical uplink control channel. The method includes: sending, by a user equipment, an acknowledgement/negative-acknowledgement response message by adopting a manner based on a channel selection or based on a DFT-s-OFDM in a multiplexing mode according to a feedback manner or a feedback rule in the multiplexing mode configured by a base station. In the present invention, the base station can configure for the user equipment and directly indicate to the user equipment through the higher layer signaling the feedback manner in the multiplexing mode, and can also configure the feedback rule in the multiplexing mode for the user equipment; and the user equipment determines the feedback manner in the multiplexing mode according to the feedback manner or feedback rule configured by the base station.

13 Claims, 3 Drawing Sheets

(56) References Cited

U.S. PATENT DOCUMENTS

| | | | |
|---|---|---|---|
| 2011/0205981 A1* | 8/2011 | Koo et al. | 370/329 |
| 2012/0039276 A1* | 2/2012 | Li | 370/329 |
| 2012/0039279 A1* | 2/2012 | Chen et al. | 370/329 |
| 2012/0106569 A1* | 5/2012 | Che et al. | 370/437 |
| 2012/0113913 A1* | 5/2012 | Tiirola et al. | 370/329 |
| 2012/0120926 A1* | 5/2012 | Chen et al. | 370/336 |
| 2012/0182858 A1* | 7/2012 | Nakao et al. | 370/216 |
| 2012/0218881 A1* | 8/2012 | Liang et al. | 370/216 |
| 2012/0287828 A1* | 11/2012 | Chen et al. | 370/280 |
| 2013/0170407 A1* | 7/2013 | Liang et al. | 370/280 |

FOREIGN PATENT DOCUMENTS

| | | |
|---|---|---|
| CN | 101789851 A | 7/2010 |
| CN | 1010924616 A | 12/2010 |
| WO | 2009118621 A2 | 10/2009 |

* cited by examiner

METHOD AND SYSTEM FOR ACKNOWLEDGMENT/NEGATIVE ACKNOWLEDGMENT FEEDBACK ON PHYSICAL UPLINK CONTROL CHANNEL

CROSS-REFERENCE TO RELATED APPLICATIONS

This application is a U.S. national phase of PCT Application No. PCT/CN2011/070946 filed Feb. 11, 2011, which claims priority to Chinese Application No. 201010258749.8 filed Aug. 16, 2010, the disclosures of which are incorporated in their entirety by reference herein.

TECHNICAL FIELD

The present invention relates to the communication technology field, and in particular, to a method and system for feeding back an acknowledgement/negative-acknowledgement response on a physical uplink control channel.

BACKGROUND OF THE RELATED ART

In the HARQ (Hybrid Automatic Repeat Request) manner, codes sent by a transmitting end not only can detect errors but also have some error correction capability. A decoder at a receiving end, after receiving the codeword, firstly detects a error condition, if it is within the error correction capability of codes, then error correction will be carried out automatically, and if there are many errors which exceed the error correction capability of codes, but the errors can be detected, then the receiving end sends a judgment signal to the transmitting end through a feedback channel to require the transmitting end to re-transmit the information. In the OFDM (Orthogonal Frequency Division Multiplex) system, correct/wrong transmission is indicated by an ACK/NACK (Acknowledgment/negative-acknowledgement) control signaling so as to judge whether re-transmission is needed.

The long term evolution (LTE for short) system is an important plan of the 3rd Generation Partnership Project organization. FIG. 1 shows a structural diagram of a basic frame structure in an LTE system, and as shown in FIG. 1, the frame structure is divided into five levels of radio frame, half-frame, subframe, timeslot and symbol, wherein, the length of one radio frame is 10 ms, one radio frame is composed of two half-frames, the length of each half-frame is 5 ms, one half-frame is composed of 5 subframes, the length of each subframe is 1 ms, one subframe is composed of two timeslots, and the length of each timeslot is 0.5 ms.

When the LTE system adopts a normal cyclic prefix, one timeslot includes 7 uplink/downlink symbols with the length of 66.7 us, wherein, the cyclic prefix length of the first symbol is 5.21 us, and cyclic prefix length of other 6 symbols is 4.69 us.

When the LTE adopts an extended cyclic prefix, one timeslot includes 6 uplink/downlink symbols with the length of 66.7 us, wherein, the cyclic prefix length of each symbol is 16.67 us.

In the downlink HARQ of the LTE, an ACK/NACK response message of a physical downlink shared channel (PDSCH for short), when a user equipment (UE for short) is not transmitting physical uplink shared channel (PUSCH for short), is sent on a physical uplink control channel (PUCCH for short). The LTE defines a plurality of PUCCH formats, including PUCCH format 1/1a/1b and format 2/2a/2b, wherein format 1 is used for sending a scheduling request (SR for short) of the UE, formats 1a and 1b are used for feeding back a 1-bit ACK/NACK response message and a 2-bit ACK/NACK response message respectively, format 2 is used for sending downlink channel states indication (CSI for short) including CQI (channel quality indicator), PMI (precoding matrix indicator) and RI (rank indicator), format 2a is used for sending CSI and a 1-bit ACK/NACK response message, and format 2b is used for sending CSI information and a 2-bit ACK/NACK response message, and format 2a/2b is only used in a scenario that the cyclic prefix is the normal cyclic prefix.

In which, the channel structures of format 1, format 1a and format 1b are the same; format 1 multiplies a fixed modulation symbol 1 on the data symbol, and whether there is the SR information to be sent is transmitted based on whether there is the format 1 channel used for transmission; format 1a multiplies a BPSK (Binary Phase Shift Keying) symbol on the data symbol, and the transmitted BPSK symbol corresponds to the ACK/NACK of a single codeword; format 1b multiplies a QPSK (Quadrature Phase Shift Keying) symbol on the data symbol, and the transmitted QPSK symbol corresponds to the ACK/NACK of a dual-codeword; the channel structures of format 2, format 2a and format 2b are the same; format 2 transmits the CSI information on the data symbol, and the pilot (reference signal) symbol does not carry information bit; format 2a transmits the CSI information on the data symbol, and multiplies a BPSK symbol on the pilot (reference signal) symbol corresponding to the ACK/NACK to a single codeword; format 2b transmits the CSI information on the data symbol, and multiplies a QPSK symbol on the pilot (reference signal) symbol corresponding to the ACK/NACK to a dual-codeword; and the 2-bit information transmitted by the PUCCH format 1b is defined as b(0) and b(1).

In an LTE time division duplex system, two ACK/NACK feedback modes are supported. One is ACK/NACK bundling, the main idea of the feedback mode is to carry out a logic 'AND' operation on the ACK/NACK of the codeword corresponding to each downlink subframe which is fed back in the uplink subframe, if one downlink subframe has 2 codewords, the UE needs to feed back 2-bit ACK/NACK, and if each subframe only has one codeword, then the UE needs to feed back 1-bit ACK/NACK. The other is ACK/NACK multiplexing mode, the core concept of that feedback mode is, by using different PUCCH channels and different modulation symbols on the channel, to represent different feedback states of the downlink subframe which are fed back in the uplink subframe, if there are a plurality of codewords on the downlink subframe, firstly to carry out a logic 'AND' (also referred to as spatial bundling) operation on the ACK/NACK fed back by the plurality of codewords of the downlink subframe, then select one PUCCH channel and the corresponding 2-bit information b(0)b(1) carried on that channel in light of an agreed rule between both the base station and the user equipment and according to the ACK/NACK of each downlink subframe after carrying out the codeword logic 'AND' operation, and finally send the corresponding 2-bit information b(0)b(1) by using the PUCCH format 1b and on the selected PUCCH channel. That is to say, the ACK/NACK after carrying out the logic 'AND' operation between codewords is represented by the 2-bit information b(0) and b(1) carried by the PUCCH format 1b and the index of the PUCCH channel. Since in that method, the ACK/NACK of different downlink subframes are represented by selecting different PUCCH channels, the method can also be referred to as a channel selection.

In order to meet the requirement of the International Telecommunication Union-Advanced (ITU-Advanced for short), the long term evolution advanced (LTE-A for short) system as the evolution standard of LTE needs to support larger system bandwidth (up to 100 MHz), and needs to be backward compatible with the existing standard of the LTE. On the basis of the existing LTE system, the bandwidth of the LTE system can be combined to obtain larger bandwidth, and this technology is referred to as a carrier aggregation (CA for short) technology, which can enhance the frequency spectrum utilization rate of the IMT-Advance system and mitigate the lack of frequency spectrum resources, thereby optimizing the use of frequency spectrum resources.

When the LTE-A adopts the carrier aggregation technology, and when the UE is configured with 4 downlink component carriers, the UE needs to feed back the ACK/NACK of these 4 downlink component carriers. If in the MIMO situation the UE needs to feed back the ACK/NACK of each codeword, then, when the UE configures 4 downlink component carriers, the UE needs to feed back 8 ACK/NACK. At present, for the LTE-A system, there are mainly two solutions discussed for sending a plurality of ACK/NACK response messages: one is a solution based on the channel selection, and the other is a solution based on DFT-s-OFDM (Discrete Fourier Transform spread Orthogonal Frequency Division Multiplexing). FIG. 2 gives a schematic diagram of a solution based on the DFT-s-OFDM. In the schematic diagram, the ACK/NACK bit(s) needed to be fed back is mapped on the corresponding symbol(s) for sending information bit(s) after channel encoding, scrambling, modulating and DFT transforming, and then sent out by forming a subframe with a reference signal (RS). Since the DFT transform is used during the signal processing of the transmitting end, the manner is referred to as a solution based on the DFT-s-OFDM. However, at present there is still no conclusion about how to specifically determine the sending method of the ACK/NACK.

CONTENT OF THE INVENTION

The technical problem solved by the present invention is to provide a method and system for feeding back an acknowledgement/negative-acknowledgement response on a physical uplink control channel, and provide a method for feeding back an acknowledgement/negative-acknowledgement response message on a physical uplink control channel in a scenario of carrier aggregation.

In order to solve the above technical problem, the present invention provides a method for feeding back an acknowledgement/negative-acknowledgement response message on a physical uplink control channel, and the method comprises:

sending, by a user equipment, an acknowledgement/negative-acknowledgement response message by adopting a manner based on a channel selection or based on a Discrete Fourier Transform spread Orthogonal Frequency Division Multiplexing (DFT-s-OFDM) in a multiplexing mode according to a feedback manner or a feedback rule in the multiplexing mode configured by a base station.

The method further comprises: configuring, by the base station, the feedback manner in the multiplexing mode for the user equipment, and indicating the user equipment, through a higher layer signaling, to send the acknowledgement/negative-acknowledgement response message by adopting the manner based on the channel selection or based on the DFT-s-OFDM in the multiplexing mode.

Wherein, the step of configuring, by the base station, the feedback manner in the multiplexing mode for the user equipment, and indicating the user equipment, through the higher layer signaling, to send the acknowledgement/negative-acknowledgement response message by adopting the manner based on the channel selection or based on the DFT-s-OFDM in the multiplexing mode comprises:

if the user equipment is only able to support to feed back the acknowledgement/negative-acknowledgement response message in the manner based on the channel selection, then the base station indicating the user equipment to send the acknowledgement/negative-acknowledgement response message by adopting the manner based on the channel selection in the multiplexing mode;

if the user equipment is only able to support to feed back the acknowledgement/negative-acknowledgement response message in the manner based on the DFT-s-OFDM, then the base station indicating the user equipment to send the acknowledgement/negative-acknowledgement response message by adopting the manner based on the DFT-s-OFDM in the multiplexing mode;

if the user equipment is able to support to feed back the acknowledgement/negative-acknowledgement response message not only in the manner based on the channel selection but also in the manner based on the DFT-s-OFDM, then the base station indicating the user equipment to send the acknowledgement/negative-acknowledgement response message by adopting the manner based on the channel selection or the manner based on the DFT-s-OFDM.

Wherein, if the user equipment is able to support to feed back the acknowledgement/negative-acknowledgement response message not only in the manner based on the channel selection but also in the manner based on the DFT-s-OFDM, then the base station, according to a location of the user equipment in a cell and an actual channel condition, indicates the user equipment to send the acknowledgement/negative-acknowledgement response message by adopting the manner based on the channel selection or based on the DFT-s-OFDM in the multiplexing mode.

Wherein, when the base station indicates the user equipment to feed back the acknowledgement/negative-acknowledgement response message by adopting the manner based on the channel selection in the multiplexing mode, before the user equipment feeds back the acknowledgement/negative-acknowledgement response message, the method further comprises:

if the number of bits of the acknowledgement/negative-acknowledgement response message needed to be fed back by the user equipment exceeds N, then the user equipment carrying out a logic AND operation between codeword streams on the acknowledgement/negative-acknowledgement response message of each downlink component carrier at first;

if the number of bits needed to be fed back still exceeds N after the logic AND operation between the codeword streams is carried out, then the user equipment carrying out a logic AND operation between component carriers on the acknowledgement/negative-acknowledgement response message of each component carrier after the logic AND operation between the codeword streams is carried out.

Wherein, a value of N is 4.

Wherein, the user equipment carries out the logic AND operation between the component carriers on specified component carriers according to a pre-engagement with the base station.

Wherein, the user equipment determines to send the acknowledgement/negative-acknowledgement response message by adopting the manner based on the channel selection or based on the DFT-s-OFDM in the multiplexing mode, according to capability of the user equipment feeding back acknowledge/non-acknowledge response and/or the number of bits of the acknowledgement/negative-acknowledgement response message needed to be fed back according to the feedback rule in the multiplexing mode configured by the base station.

Wherein, the feedback rule in the multiplexing mode configured by the base station comprises:

if the user equipment is only able to support to feed back the acknowledgement/negative-acknowledgement response message in the manner based on the channel selection, then the user equipment sending the acknowledgement/negative-acknowledgement response message by adopting the manner based on the channel selection in the multiplexing mode;

if the user equipment is only able to support to feed back the acknowledgement/negative-acknowledgement response message in the manner based on the DFT-s-OFDM, then the user equipment sending the acknowledgement/negative-acknowledgement response message by adopting the manner based on the DFT-s-OFDM in the multiplexing mode;

if the user equipment is able to support to feed back the acknowledgement/negative-acknowledgement response message not only in the manner based on the channel selection but also in the manner based on the DFT-s-OFDM, then the user equipment determining to send the acknowledgement/negative-acknowledgement response message by adopting the manner based on the channel selection or based on the DFT-s-OFDM in the multiplexing mode according to the number of bits of the acknowledgement/negative-acknowledgement response message needed to be fed back.

Wherein, the user equipment determining to send the acknowledgement/negative-acknowledgement response message by adopting the manner based on the channel selection or based on the DFT-s-OFDM in the multiplexing mode according to the number of bits of the acknowledgement/negative-acknowledgement response message needed to be fed back comprises:

when the number of bits of the acknowledgement/negative-acknowledgement response message needed to be fed back by the user equipment does not exceed N, determining to send the acknowledgement/negative-acknowledgement response message by adopting the manner based on the channel selection in the multiplexing mode;

when the number of bits of the acknowledgement/negative-acknowledgement response message needed to be fed back by the user equipment exceeds N, determining to send the acknowledgement/negative-acknowledgement response message by adopting the manner based on the DFT-s-OFDM in the multiplexing mode.

Wherein, the number of bits of the acknowledgement/negative-acknowledgement response message needed to be fed back by the user equipment is determined according to a downlink component carrier set configured by the base station for the user equipment;

or, is determined together according to a downlink component carrier set and a maximum value of codeword stream numbers contained in a downlink component carrier;

or, is determined according to a configured transmission mode of each downlink component carrier;

or, is determined according to a downlink control information type detected by the user equipment.

Wherein, when the number of bits of the acknowledgement/negative-acknowledgement response message needed to be fed back by the user equipment is determined together according to the downlink component carrier set and the maximum value of codeword stream numbers contained in the downlink component carrier, the method further comprises: for a component carrier with only one codeword stream, setting the acknowledgement/negative-acknowledgement response message of the corresponding second codeword stream as a default value.

Wherein, a value of N is 4.

The present invention also provides a system for feeding back an acknowledgement/negative-acknowledgement response message on a physical uplink control channel, and the system comprises a feedback manner determination unit and an acknowledgement/negative-acknowledgement response message (ACK/NACK) feedback unit in a user equipment, wherein:

the feedback manner determination unit is configured to: determine to send an acknowledgement/negative-acknowledgement response message by adopting a feedback manner based on a channel selection or based on a Discrete Fourier Transform spread Orthogonal Frequency Division Multiplexing (DFT-s-OFDM) in a multiplexing mode according to a feedback manner or a feedback rule in the multiplexing mode configured by a base station; and the ACK/NACK feedback unit is configured to: send the acknowledgement/negative-acknowledgement response message by adopting the manner based on the channel selection or based on the DFT-s-OFDM in the multiplexing mode.

Wherein, the ACK/NACK feedback unit comprises a channel selection sending module and/or a DFT-s-OFDM sending module, and wherein:

the channel selection sending module is configured to: send the acknowledgement/negative-acknowledgement response message by adopting the manner based on the channel selection; and the DFT-s-OFDM sending module is configured to: send the acknowledgement/negative-acknowledgement response message by adopting the manner based on the DFT-s-OFDM.

Wherein, the system further comprises a feedback manner configuration unit in the base station, wherein:

the feedback manner configuration unit is configured to: configure the feedback manner in the multiplexing mode for the user equipment, and indicate the user equipment, through a higher layer signaling, to send the acknowledgement/negative-acknowledgement response message by adopting the manner based on the channel selection or based on the DFT-s-OFDM in the multiplexing mode; and the feedback manner determination unit is configured to: determine to send the acknowledgement/negative-acknowledgement response message by adopting the manner based on the channel selection or based on the DFT-s-OFDM in the multiplexing mode according to the indication in the received higher layer signaling.

Wherein, the feedback manner configuration unit is configured to configure the feedback manner in the multiplexing mode for the user equipment according to the following manners:

if the user equipment is only able to support to feed back the acknowledgement/negative-acknowledgement response message in the manner based on the channel selection, then indicating the user equipment to send the acknowledgement/negative-acknowledgement response message by adopting the manner based on the channel selection in the multiplexing mode;

if the user equipment is only able to support to feed back the acknowledgement/negative-acknowledgement response message in the manner based on the DFT-s-OFDM, then indicating the user equipment to send the acknowledgement/negative-acknowledgement response message by adopting the manner based on the DFT-s-OFDM in the multiplexing mode;

if the user equipment is able to support to feed back the acknowledgement/negative-acknowledgement response message not only in the manner based on the channel selection but also in the manner based on the DFT-s-OFDM, then indicating the user equipment to send the acknowledgement/negative-acknowledgement response message by adopting the manner based on the channel selection or based on the DFT-s-OFDM.

Wherein, the feedback manner configuration unit is configured to: if the user equipment is able to support to feed back the acknowledgement/negative-acknowledgement response message not only in the manner based on the channel selection but also in the manner based on the DFT-s-OFDM, then indicate the user equipment to send the acknowledgement/negative acknowledgement response message by adopting the manner based on the channel selection or based on the DFT-s-OFDM in the multiplexing mode according to a location of the user equipment in a cell and an actual channel condition.

Wherein, the channel selection sending module is further configured to, before sending the acknowledgement/negative-acknowledgement response message, carry out the following judgment and processing on the acknowledgement/negative-acknowledgement response message needed to be fed back and then send:

when the number of bits of the acknowledgement/negative-acknowledgement response message needed to be fed back exceeds N, then a logic AND operation between codeword streams is carried out on the acknowledgement/negative-acknowledgement response message of each downlink component carrier at first; and if the number of bits needed to be fed back still exceeds N after the logic AND operation between the codeword streams is carried out, then a logic AND operation between component carriers is carried out on the acknowledgement/negative-acknowledgement response message of each component carrier after the logic AND operation between the codeword streams is carried out.

Wherein, the system further comprises a feedback rule configuration unit in the base station, wherein, the feedback rule configuration unit is configured to: configure the feedback rule in the multiplexing mode for the user equipment; and the feedback manner determination unit is configured to: determine to send the acknowledgement/negative-acknowledgement response message by adopting the manner based on the channel selection or based on the DFT-s-OFDM in the multiplexing mode according to capability of the user equipment feeding back acknowledge/non-acknowledge response and/or the number of bits of the acknowledgement/negative-acknowledgement response message needed to be fed back according to the feedback rule in the multiplexing mode configured by the base station.

Wherein, the feedback rule in the multiplexing mode configured by the feedback rule configuration unit for the user equipment comprises:

if the user equipment is only able to support to feed back the acknowledgement/negative-acknowledgement response message in the manner based on the channel selection, then the user equipment sending the acknowledgement/negative-acknowledgement response message by adopting the manner based on the channel selection in the multiplexing mode;

if the user equipment is only able to support to feed back the acknowledgement/negative-acknowledgement response message in the manner based on the DFT-s-OFDM, then the user equipment sending the acknowledgement/negative-acknowledgement response message by adopting the manner based on the DFT-s-OFDM in the multiplexing mode;

if the user equipment is able to support to feed back the acknowledgement/negative acknowledgement response message not only in the manner based on the channel selection but also in the manner based on the DFT-s-OFDM, then the user equipment determining to send the acknowledgement/negative-acknowledgement response message by adopting the manner based on the channel selection or based on the DFT-s-OFDM in the multiplexing mode according to the number of bits of the acknowledgement/negative-acknowledgement response message needed to be fed back.

Wherein, the feedback manner determination unit is configured to determine to send the acknowledgement/negative-acknowledgement response message by adopting the manner based on the channel selection or based on the DFT-s-OFDM in the multiplexing mode according to the number of bits of the acknowledgement/negative-acknowledgement response message needed to be fed back by the following manner:

when the number of bits of the acknowledgement/negative-acknowledgement response message needed to be fed back by the user equipment does not exceed N, determining to send the acknowledgement/negative-acknowledgement response message by adopting the manner based on the channel selection in the multiplexing mode; and when the number of bits of the acknowledgement/negative-acknowledgement response message needed to be fed back by the user equipment exceeds N, determining to send the acknowledgement/negative-acknowledgement response message by adopting the manner based on the DFT-s-OFDM in the multiplexing mode;

wherein, a value of N is 4.

Wherein, the feedback manner determination unit is further configured to: determine the number of bits of the acknowledgement/negative-acknowledgement response message needed to be fed back by the user equipment according to the following manner:

determine according to a downlink component carrier set configured by the base station for the user equipment;

or, determine together according to a downlink component carrier set and a maximum value of codeword stream numbers contained in a downlink component carrier;

or, determine according to a configured transmission mode of each downlink component carrier;

or, determine according to a downlink control information type detected by the user equipment.

Wherein, the ACK/NACK feedback unit is further configured to: when the number of bits of the acknowledgement/negative-acknowledgement response message needed to be fed back by the user equipment is determined together according to the downlink carrier set and the maximum value of codeword stream numbers contained in the downlink component carrier, for a component carrier with only one codeword stream, set the acknowledgement/negative-acknowledgement response message of the corresponding second codeword stream as a default value.

The present invention provides a solution for feeding back an acknowledgement/negative-acknowledgement response message on a physical uplink control channel in a carrier aggregation scenario. According to the technical solution of the present invention, the base station can configure for the user equipment and directly indicate to the user equipment through the higher layer signaling the feedback manner in the multiplexing mode, and can also configure the feedback rule in the multiplexing mode for the user equipment; and the user equipment determines the feedback manner in the multiplexing mode according to the feedback manner or feedback rule configured by the base station. Furthermore, the user equipment can also determine the feedback manner in the multiplexing mode according to two capabilities of supporting channel selection and DFT-s-OFDM and/or the number of bits of the ACK/NACK message needed to be fed back. In addition, the solution of the present invention not only can be applied in the UE with the above two capabilities but also can be applied in the UE which only supports one of the two capabilities.

BRIEF DESCRIPTION OF DRAWINGS

The accompanying drawings are used for providing further understanding to the present invention, constitute a part of specification, combine with the embodiments of the present invention together for explaining the present invention and are not intended to limit the present invention. In the drawings.

Figure 1:
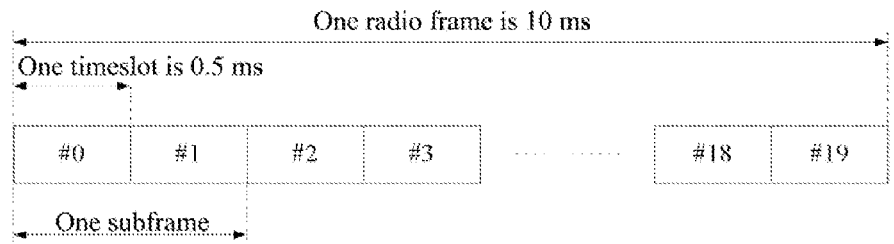
FIG. 1 is a structural diagram of a basic frame structure in an LTE system according to the related art.

edgement response message in the multiplexing mode by adopting the manner of a channel selection or a DFT-s-OFDM according to the feedback manner configured by the base station.

Wherein, the user equipment sends the acknowledgement/negative-acknowledgement response message according to the feedback manner configured by the base station includes but not limited to one of the following manners or any combination thereof:

Multiplexing Manner 1:

In the multiplexing manner 1, the UE determines to adopt the channel selection or the DFT-s-OFDM according to the number of bits of ACK/NACK needed to be fed back.

Furthermore, the UE sends the ACK/NACK response message by adopting the manner based on the channel selection when the number of bits of ACK/NACK to be fed back does not exceed N; and the UE sends the ACK/NACK response message by adopting the manner based on the DFT-s-OFDM when the number of bits of ACK/NACK to be fed back exceeds N.

Furthermore, the number of bits needed to be fed back is determined according to a downlink component carrier set configured by the UE; or determined together according to a downlink component carrier set and the maximum value of codeword stream numbers contained in a downlink component carrier; or determined according to a configured transmission mode of each downlink component carrier; or, determining according to a DCI (downlink control information) type detected by the UE.

Furthermore, when the number of bits needed to be fed back is determined according to the downlink component carrier set configured by the UE, assuming that the downlink component carrier set configured by the UE is $S=\{DLCC_i\}$, $i=0, 1, \ldots M-1$, then the number of bits needed to be fed back by the UE is $L=M$;

when the number of bits needed to be fed back is determined together according to the downlink component carrier set configured by the UE and the maximum value of the codeword stream numbers contained in the downlink component carrier, assuming that the downlink component carrier set configured by the UE is $S=\{DLCC_i\}$, $i=0, 1, \ldots, M-1$ and the maximum value of the codeword stream numbers contained in the downlink component carrier is w, and $$w = \begin{cases} 1, & \text{when each of all the downlink component carriers only has only codeword stream,} \\ 2, & \text{when at least one downlink component carrier contains two codeword streams} \end{cases}$$

PREFERRED EMBODIMENTS OF THE PRESENT INVENTION

The core concept of the present invention is in that, a base station configures a feedback manner of an acknowledgement/negative-acknowledgement response message in a multiplexing mode for a user equipment, and the user equipment determines to send the acknowledgement/negative-acknowlthen the number of bits needed to be fed back by the UE is $L=M*w$;

when the number of bits needed to be fed back is determined according to the configured transmission mode of each downlink component carrier, assuming that in the configured transmission mode the number of bits needed to be fed back by each downlink component carrier is $x_i$, $i=0, 1, \ldots, M-1$, and $$x_i = \begin{cases} 1, & \text{when transmission mode of downlink component carrier only includes one codeword stream,} \\ 2, & \text{when transmission mode of downlink component carrier contains two codeword streams} \end{cases}$$

then the number of bits needed to be fed back by the UE is $$L = \sum_{i=0}^{M-1} x_i.$$

Furthermore, when the number of bits needed to be fed back is determined according to the downlink component carrier set and the maximum value of the codeword stream numbers contained in the downlink component carrier, for a component carrier with only one codeword stream, the ACK/NACK response message of its corresponding second codeword stream is set as a default value.

Multiplexing Manner 2:

The base station indicates the UE to feed back the acknowledgement/negative-acknowledgement response message in the multiplexing mode by adopting the manner based on the channel selection or based on the DFT-s-OFDM through a higher layer signaling.

When the base station notifies the UE to feed back the acknowledgement/negative-acknowledgement response message in the multiplexing mode by adopting the manner based on the channel selection through the higher layer signaling, if the number of bits of ACK/NACK needed to be fed back by the UE exceeds 4, then the UE firstly carries out a logic AND operation between codeword streams on the ACK/NACK response message of each downlink component carrier; and if the number of bits to be fed back still exceeds 4 after the logic AND operation between codeword streams is carried out, then the UE carries out a logic AND operation between component carriers on the ACK/NACK response message of each component carrier after the logic AND operation between codeword streams is carried out, so as to ensure that the number of bits of the ACK/NACK response message to be fed back does not exceed 4.

Wherein, the user equipment carries out the logic AND operation between component carriers on the specified component carriers according to a pre-engagement with the base station, i.e., carrying out the logic AND operation on which component carriers are engaged between both the base station and the user equipment.

Furthermore, the number of bits needed to be fed back by the UE is determined according to a downlink carrier set configured by the UE; or, determined together according to a downlink component carrier set and the maximum value of codeword streams contained in a downlink component carrier; or, determined according to a configured transmission mode of the downlink component carrier; or, determined according to a DCI type detected by the UE.

When the base station notifies the UE to feed back the acknowledgement/negative-acknowledgement response message in the multiplexing mode by adopting the manner based on the DFT-s-OFDM through the higher layer signaling, the UE carries out channel encoding, scrambling, modulating, and DFT transform on the bits corresponding to the ACK/NACK response message of each codeword stream of each component carrier, maps them onto a corresponding symbol for sending information bits, and then sends out by forming a subframe with a reference signal (RS).

Multiplexing Manner 3:

The UE determines to feed back the acknowledgement/negative-acknowledgement response message in the multiplexing mode by adopting the manner based on the channel selection or based on the DFT-s-OFDM according to its own capability.

The UE which can only support the manner based on the channel selection at most supports 4-bit ACK/NACK feedback; and the UE which not only can support the manner based on the DFT-s-OFDM but also can support the manner based on the channel selection can support ACK/NACK feedback more than 4 bits.

Wherein, the user equipment will notify or report its relevant capability to the base station after accessing the system. For example, when a certain user equipment can support to feed back the ACK/NACK response message in the manner of the DFT-s-OFDM, then when the base station configures its feedback mode as multiplexing, the user equipment will feed back by adopting the manner based on the DFT-s-OFDM; while when other user equipments only supports to feed back the ACK/NACK in the manner based on the channel selection, then when the base station configures its feedback mode as multiplexing, the user equipment will feed back by adopting the manner based on the channel selection.

Hereinafter, the implementation of the technical solution of the present invention will be further described in detail in combination with the accompanying drawings and embodiments.

Embodiment One

Figure 2:
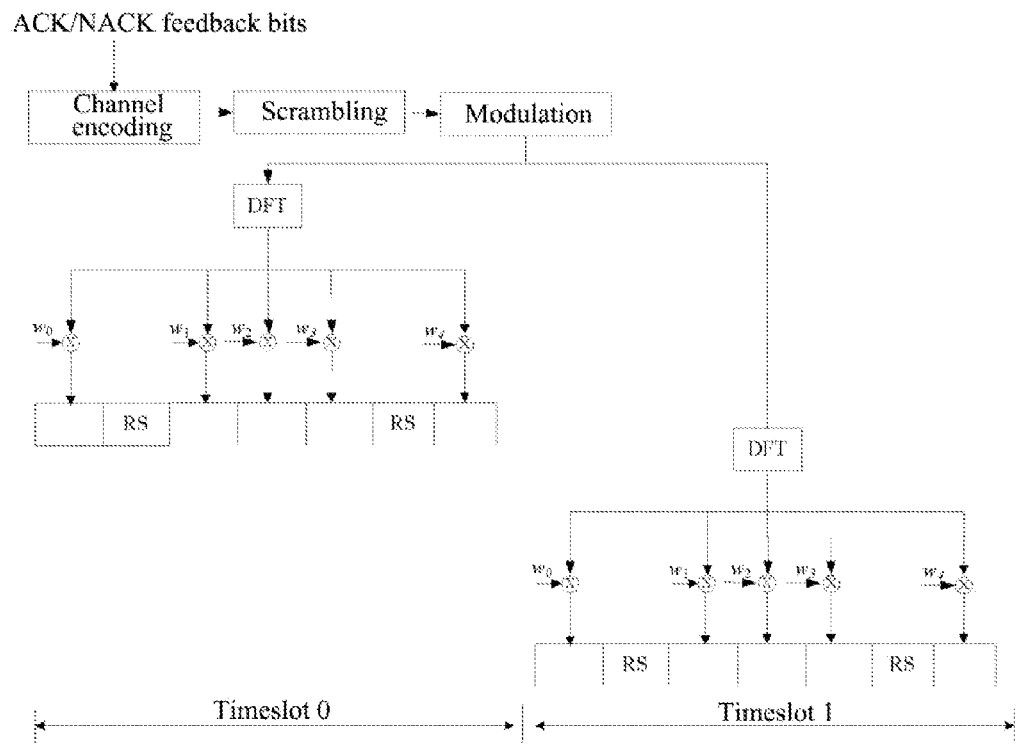
FIG. 2 is a structural diagram of a solution based on DFT-s-OFDM.

As shown in FIG. 2, in an LTE-Advanced communication system, for a certain UE with carrier aggregation capability, the base station notifies the UE through a higher layer signaling that a downlink carrier aggregation set is {DL CC#0, DL CC#1, DL CC#2}, wherein, the downlink transmission mode of DL CC#0 is MIMO mode while the downlink transmission modes of DL CC#1 and DL CC#2 are non-MIMO, and the base station configures for the UE to send the ACK/NACK response message by adopting the multiplexing manner 1, and it is assumed that all the base station DL CC#0/#1/#2 have data to be scheduled to the UE.

In this embodiment, when the number of bits to be fed back is determined together according to the downlink carrier set and the maximum value of the codeword stream numbers contained in the downlink component carrier, the UE needs to feed back 6-bit ACK/NACK information; and at the same time, for DL CC#1 and #2, the ACK/NACK response message of the second codeword stream is set as a default NACK, and at the moment, the UE will adopt the manner of the DFT-s-OFDM and feed back the 6-bit ACK/NACK response message through a new PUCCH format.

When the number of bits to be fed back is determined according to the configured transmission mode of the downlink component carrier, the UE needs to feed back 4-bit ACK/NACK information, and at the moment, the UE will feed back the 4-bit ACK/NACK response message by adopting the manner of the channel selection.

Embodiment Two

Figure 3:
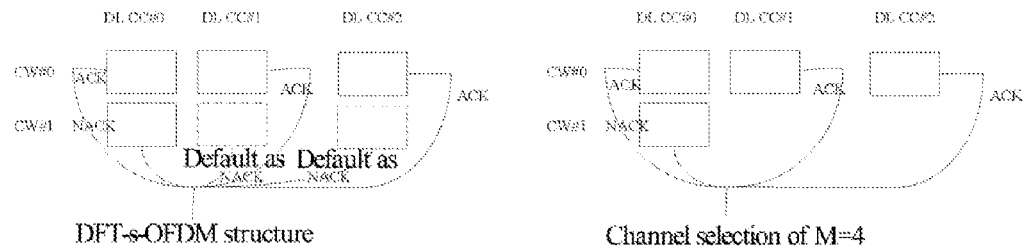
FIG. 3 is a schematic diagram of a multiplexing manner 1 adopting a multiplexing mode in an embodiment one of the present invention.

As shown in FIG. 3, in an LTE-Advanced communication system, for a certain UE with carrier aggregation capability, the base station notifies the UE through a higher layer signaling that a downlink carrier aggregation set is {DL CC#0, DL CC#1}, wherein, the downlink transmission mode of DL CC#0 is MIMO mode while the downlink transmission mode of DL CC#1 is non-MIMO, and the base station notifies the UE through the higher layer signaling to send the ACK/NACK response message by adopting the channel selection of the multiplexing manner 2, and it is assumed that the base station DL CC#0/#1 both have data to be scheduled to the UE.

When the number of bits to be fed back is determined together according to the downlink carrier set and the maximum value of the codeword stream numbers contained in the downlink component carrier, the UE needs to feed back 4-bit ACK/NACK information; and at the same time, for DL CC#1, the ACK/NACK response message of the second codeword stream is set as a default NACK, and at the moment, the UE will adopt the manner of the channel selection to feed back the 4-bit ACK/NACK response message.

When the number of bits to be fed back is determined according to the configured transmission mode of the downlink component carrier, the UE needs to feed back 3-bit ACK/NACK information, and at the moment, the UE will feed back the 3-bit ACK/NACK response message by adopting the manner of the channel selection.

Embodiment Three

Figure 4:
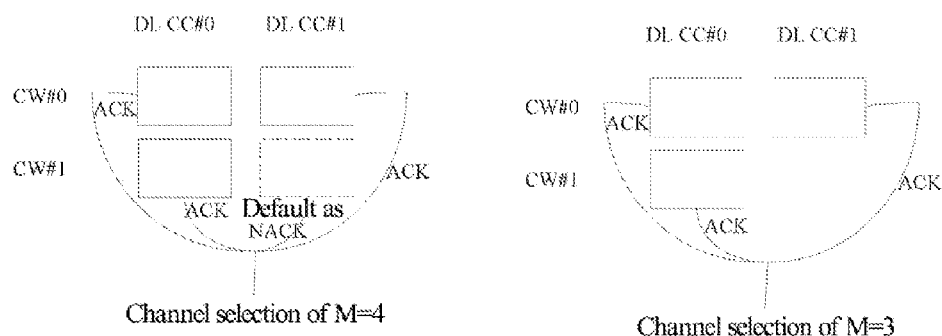
FIG. 4 is a schematic diagram of a multiplexing manner 1 adopting a multiplexing mode in an embodiment two of the present invention.

As shown in FIG. 4, in an LTE-Advanced communication system, for a certain UE with carrier aggregation capability, the base station notifies the UE through a higher layer signaling that a downlink carrier aggregation set is {DL CC#0, DL CC#1, DL CC#2}, wherein, the downlink transmission mode of DL CC#0 is MIMO mode while the downlink transmission modes of DL CC#1 and DL CC#2 are non-MIMO, and the base station notifies the UE through the higher layer signaling to send the ACK/NACK response message by adopting multiplexing manner 2, and it is assumed that all the base station DL CC#0/#1/#2 have data to be scheduled to the UE.

When the number of bits to be fed back is determined according to the downlink carrier set and the maximum value of the codeword stream numbers contained in the downlink component carrier, the UE needs to feed back 6-bit ACK/NACK information; since the number of bits to be fed back exceeds 4, for DL CC#1 and #2, the ACK/NACK response message of the second codeword stream is set as a default ACK, then a logic AND operation between codeword streams is carried out on each downlink component carrier to obtain the ACK/NACK response message after DL CC#0/#1/#2 goes through the logic AND operation between codeword streams, and finally the 3-bit ACK/NACK response message is fed back by adopting the manner of the channel selection.

When the number of bits to be fed back is determined according to the configured transmission mode of the downlink component carrier, the UE needs to feed back 4-bit ACK/NACK information, and at the moment, the UE will feed back the 4-bit ACK/NACK response message by adopting the manner of the channel selection.

Embodiment Four

Figure 5:
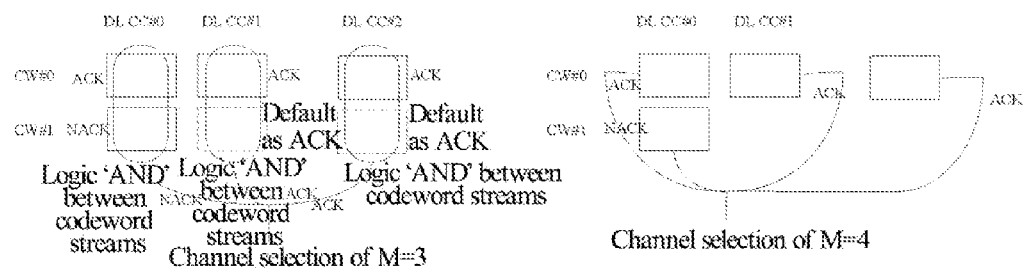
FIG. 5 is a schematic diagram of a multiplexing manner 2 adopting a multiplexing mode in an embodiment three of the present invention.

As shown in FIG. 5, in an LTE-Advanced communication system, for a certain UE with carrier aggregation capability, the base station notifies the UE through a higher layer signaling that a downlink carrier aggregation set is {DL CC#0, DL CC#1, DL CC#2}, wherein, the downlink transmission mode of DL CC#0 is MIMO mode, while the downlink transmission modes of DL CC#1 and DL CC#2 are non-MIMO, and the base station notifies the UE through the higher layer signaling to send the ACK/NACK response message by adopting DFT-s-OFDM of multiplexing manner 2, and it is assumed that all the base station DL CC#0/#1/#2 have data to be scheduled to the UE.

When the number of bits to be fed back is determined according to the downlink carrier set and the maximum value of the codeword stream numbers contained in the downlink component carrier, the UE needs to feed back 6-bit ACK/NACK information, and at the moment, the UE will adopt the manner of the DFT-s-OFDM and feed back the 6-bit ACK/NACK response message through a new PUCCH format.

When the number of bits to be fed back is determined according to the configured transmission mode of the downlink component carrier, the UE needs to feed back 4-bit ACK/NACK information, and at the moment, the UE will feed back the 4-bit ACK/NACK response message through a new PUCCH format and by adopting the manner of the DFT-s-OFDM.

Embodiment Five

As shown in FIG. 5, in an LTE-Advanced communication system, for a certain UE with carrier aggregation capability, the base station notifies the UE through a higher layer signaling that a downlink carrier aggregation set is {DL CC#0, DL CC#1, DL CC#2}, wherein, the downlink transmission mode of DL CC#0 is MIMO mode, while the downlink transmission modes of DL CC#1 and DL CC#2 are non-MIMO, and the base station notifies the UE through the higher layer signaling to send the ACK/NACK response message by adopting the multiplexing mode, and it is assumed that all the base station DL CC#0/#1/#2 have data to be scheduled to the UE.

The user equipment, after accessing the system, notifies the base station of its capability of feeding back ACK/NACK, and assuming that the user equipment at most can support 4-bit ACK/NACK feedback and can only support to feed back the ACK/NACK in the manner of the channel selection, then, when the number of bits to be fed back is determined according to the downlink carrier set and the maximum value of the codeword stream numbers contained in the downlink component carrier, the UE needs to feed back 6-bit ACK/NACK information; since the number of bits to be fed back exceeds 4, for DL CC#1 and #2, the ACK/NACK response message of the second codeword stream is set as a default ACK, then a logic AND operation between codeword streams is carried out on each downlink component carrier to obtain the ACK/NACK response message after DL CC#0/#1/#2 goes through the logic AND operation between codeword streams, and finally the 3-bit ACK/NACK response message is fed back by adopting the manner of the channel selection.

When the number of bits to be fed back is determined according to the configured transmission mode of the downlink component carrier, the UE needs to feed back 4-bit ACK/NACK information, and at the moment, the UE will feed back the 4-bit ACK/NACK response message by adopting the manner of the channel selection.

Embodiment Six

Figure 6:
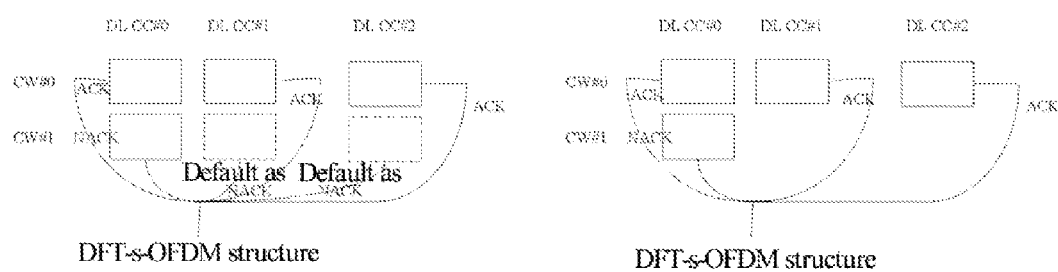
FIG. 6 is a schematic diagram of a multiplexing manner 2 adopting a multiplexing mode in an embodiment four of the present invention.

As shown in FIG. 6, in an LTE-Advanced communication system, for a certain UE with carrier aggregation capability, the base station notifies the UE through a higher layer signaling that a downlink carrier aggregation set is {DL CC#0, DL CC#1, DL CC#2}, wherein, the downlink transmission mode of DL CC#0 is MIMO mode, while the downlink transmission modes of DL CC#1 and DL CC#2 are non-MIMO, and the base station notifies the UE through the higher layer signaling to send the ACK/NACK response message by adopting the multiplexing mode, and it is assumed that all the base station DL CC#0/#1/#2 have data to be scheduled to the UE.

The user equipment, after accessing the system, notifies the base station of its capability of feeding back ACK/NACK, and assuming that the user equipment can support more than 4 bits feedback of the ACK/NACK response message and can only support to feed back the ACK/NACK in the manner base on the DFT-s-OFDM, then, when the number of bits to be fed back is determined according to the downlink carrier set and the maximum value of the codeword stream numbers contained in the downlink component carrier, the UE needs to feed back 6-bit ACK/NACK information, and at the moment, the UE will adopt the manner of the DFT-s-OFDM and feed back the 6-bit ACK/NACK response message through a new PUCCH format.

When the number of bits to be fed back is determined according to the configured transmission mode of the downlink component carrier, the UE needs to feed back 4-bit ACK/NACK information, and at the moment, the UE will feed back the 4-bit ACK/NACK response message through a new PUCCH format and by adopting the manner of the DFT-s-OFDM.

Accordingly, the embodiment of the present invention also provides a system for feeding back an acknowledgement/negative-acknowledgement response message on a physical uplink control channel (not shown in the drawings), and the system comprises a feedback manner determination unit and an ACK/NACK feedback unit in a user equipment, wherein:

the feedback manner determination unit is configured to: determine to send an acknowledgement/negative-acknowledgement response message by adopting a feedback manner based on a channel selection or based on a Discrete Fourier Transform spread Orthogonal Frequency Division Multiplexing (DFT-s-OFDM) in a multiplexing mode according to a feedback manner or a feedback rule in the multiplexing mode configured by a base station; and the ACK/NACK feedback unit is configured to: send the acknowledgement/negative-acknowledgement response message by adopting the manner based on the channel selection or based on the DFT-s-OFDM in the multiplexing mode.

Wherein, the ACK/NACK feedback unit comprises a channel selection sending module and/or a DFT-s-OFDM sending module, and wherein:

the channel selection sending module is configured to: send the acknowledgement/negative-acknowledgement response message by adopting the manner based on the channel selection; and the DFT-s-OFDM sending module is configured to: send the acknowledgement/negative-acknowledgement response message by adopting the manner based on the DFT-s-OFDM.

Wherein, the system further comprises a feedback manner configuration unit in the base station, wherein:

the feedback manner configuration unit is configured to: configure the feedback manner in the multiplexing mode for the user equipment, and indicate the user equipment, through a higher layer signaling, to send the acknowledgement/negative-acknowledgement response message by adopting the manner based on the channel selection or based on the DFT-s-OFDM in the multiplexing mode; and the feedback manner determination unit is further configured to: determine to send the acknowledgement/negative-acknowledgement response message by adopting the manner based on the channel selection or based on the DFT-s-OFDM in the multiplexing mode according to the indication in the received higher layer signaling.

Wherein, the feedback manner configuration unit is further configured to configure the feedback manner in the multiplexing mode for the user equipment according to the following manners:

if the user equipment is only able to support to feed back the acknowledgement/negative-acknowledgement response message in the manner based on the channel selection, then indicating the user equipment to send the acknowledgement/negative-acknowledgement response message by adopting the manner based on the channel selection in the multiplexing mode;

if the user equipment is only able to support to feed back the acknowledgement/negative-acknowledgement response message in the manner based on the DFT-s-OFDM, then indicating the user equipment to send the acknowledgement/negative-acknowledgement response message by adopting the manner based on the DFT-s-OFDM in the multiplexing mode;

if the user equipment is able to support to feed back the acknowledgement/negative-acknowledgement response message not only in the manner based on the channel selection but also in the manner based on the DFT-s-OFDM, then indicating the user equipment to send the acknowledgement/negative-acknowledgement response message by adopting the manner based on the channel selection or based on the DFT-s-OFDM.

Wherein, the feedback manner configuration unit is further configured to: if the user equipment is able to support to feed back the acknowledgement/negative-acknowledgement response message not only in the manner based on the channel selection but also in the manner based on the DFT-s-OFDM, then indicate the user equipment to send the acknowledgement/negative-acknowledgement response message by adopting the manner based on the channel selection or based on the DFT-s-OFDM in the multiplexing mode according to a location of the user equipment in a cell and an actual channel condition.

Wherein, the channel selection sending module is further configured to, send the acknowledgement/negative-acknowledgement response message needed to be fed back after carrying out the following judgment and processing:

when the number of bits of the acknowledgement/negative-acknowledgement response message needed to be fed back exceeds N, then a logic AND operation between codeword streams is carried out on the acknowledgement/negative-acknowledgement response message of each downlink component carrier at first; and if the number of bits needed to be fed back still exceeds N after the logic AND operation between the codeword streams is carried out, then a logic AND operation between component carriers is carried out on the acknowledgement/negative-acknowledgement response message of each component carrier after the logic AND operation between the codeword streams is carried out.

Wherein, the system further comprises a feedback rule configuration unit in the base station, wherein, the feedback rule configuration unit is configured to: configure the feedback rule in the multiplexing mode for the user equipment; and the feedback manner determination unit is further configured to: determine to send the acknowledgement/negative-acknowledgement response message by adopting the manner based on the channel selection or based on the DFT-s-OFDM in the multiplexing mode according to capability of the user equipment feeding back acknowledge/non-acknowledge response and/or the number of bits of the acknowledgement/negative-acknowledgement response message needed to be fed back according to the feedback rule in the multiplexing mode configured by the base station.

Wherein, the feedback rule in the multiplexing mode configured by the feedback rule configuration unit for the user equipment comprises:

if the user equipment is only able to support to feed back the acknowledgement/negative-acknowledgement response message in the manner based on the channel selection, then the user equipment sending the acknowledgement/negative-acknowledgement response message by adopting the manner based on the channel selection in the multiplexing mode;

if the user equipment is only able to support to feed back the acknowledgement/negative-acknowledgement response message in the manner based on the DFT-s-OFDM, then the user equipment sending the acknowledgement/negative-acknowledgement response message by adopting the manner based on the DFT-s-OFDM in the multiplexing mode;

if the user equipment is able to support to feed back the acknowledgement/negative acknowledgement response message not only in the manner based on the channel selection but also in the manner based on the DFT-s-OFDM, then the user equipment determining to send the acknowledgement/negative-acknowledgement response message by adopting the manner based on the channel selection or based on the DFT-s-OFDM in the multiplexing mode according to the number of bits of the acknowledgement/negative-acknowledgement response message needed to be fed back.

Wherein, the feedback manner determination unit is further configured to, according to the number of bits of the acknowledgement/negative-acknowledgement response message needed to be fed back, when the number of bits of the acknowledgement/negative-acknowledgement response message needed to be fed back by the user equipment does not exceed N, determining to send the acknowledgement/negative-acknowledgement response message by adopting the manner based on the channel selection in the multiplexing mode; and when the number of bits of the acknowledgement/negative-acknowledgement response message needed to be fed back by the user equipment exceeds N, determining to send the acknowledgement/negative-acknowledgement response message by adopting the manner based on the DFT-s-OFDM in the multiplexing mode;

wherein, a value of N is 4.

Wherein, the feedback manner determination unit is further configured to: determine the number of bits of the acknowledgement/negative-acknowledgement response message needed to be fed back by the user equipment according to the following manner:

determine according to a downlink component carrier set configured by the base station for the user equipment;

or, determine together according to a downlink component carrier set and a maximum value of codeword stream numbers contained in a downlink component carrier;

or, determine according to a configured transmission mode of each downlink component carrier;

or, determine according to a downlink control information type detected by the user equipment.

Wherein, the ACK/NACK feedback unit is further configured to: when the number of bits of the acknowledgement/negative-acknowledgement response message needed to be fed back by the user equipment is determined together according to the downlink carrier set and the maximum value of codeword stream numbers contained in the downlink component carrier, for a component carrier with only one codeword stream, set the acknowledgement/negative-acknowledgement response message of the corresponding second codeword stream as a default value.

What is described above is merely preferred embodiments of the present invention and is not intended to limit the present invention. The present invention can also have other various embodiments. Those skilled in the art can make various corresponding changes and variations according to the present invention without departing from the spirit and essence of the present invention, and all these corresponding changes and variations should belong to the protection scope of the appended claims of the present invention.

Those skilled in the art can understand that all of or part of the steps in the above method can be completed by instructing relevant hardware by programs, and the programs can be stored in a computer readable storage medium, such as a read only memory, a magnetic disk, or an optical disk, etc. Optionally, all of or part of the steps of the above embodiments can also be implemented by using one or more integrated circuits. Accordingly, each module/unit in the above embodiments can be implemented in the form of hardware and can also be implemented in the form of software function modules. The present invention is not limited to any particular form of combination of hardware and software.

INDUSTRIAL APPLICABILITY

According to the technical solution of the present invention, the base station can configure for the user equipment and directly indicate to the user equipment through the higher layer signaling the feedback manner in the multiplexing mode, and can also configure the feedback rule in the multiplexing mode for the user equipment; and the user equipment determines the feedback manner in the multiplexing mode according to the feedback manner or feedback rule configured by the base station. Furthermore, the user equipment can also determine the feedback manner in the multiplexing mode according to two capabilities of supporting channel selection and DFT-s-OFDM and/or the number of bits of the ACK/NACK message needed to be fed back. In addition, the solution of the present invention not only can be applied in the UE with the above two capabilities but also can be applied in the UE which only supports one of the two capabilities.

What we claim is:

1. A method for feeding back an acknowledgement/negative-acknowledgement (ACK/NACK) on a physical uplink control channel, comprising:

sending, by a user equipment, an ACK/NACK by adopting a manner based on a channel selection or based on a Discrete Fourier Transform spread Orthogonal Frequency Division Multiplexing (DFT-s-OFDM) in a multiplexing mode according to a feedback manner in the multiplexing mode configured by a base station;

configuring, by the base station, the feedback manner in the multiplexing mode for the user equipment, and indicating the user equipment, through a higher layer signaling, to send the ACK/NACK by adopting the manner based on the channel selection or based on the DFT-s-OFDM in the multiplexing mode, wherein step of configuring comprises:

if the user equipment is only able to support to feed back the ACK/NACK in the manner based on the channel selection, then the base station indicating the user equipment to send the ACK/NACK by adopting the manner based on the channel selection in the multiplexing mode;

if the user equipment is only able to support to feed back the ACK/NACK in the manner based on the DFT-s-OFDM, then the base station indicating the user equipment to send the ACK/NACK by adopting the manner based on the DFT-s-OFDM in the multiplexing mode;

if the user equipment is able to support to feed back the ACK/NACK not only in the manner based on the channel selection but also in the manner based on the DFT-s-OFDM, then the base station indicating the user equipment to send the ACK/NACK by adopting the manner based on the channel selection or the manner based on the DFT-s-OFDM.

2. The method as claimed in claim 1, wherein,
when the base station indicates the user equipment to feed back the ACK/NACK by adopting the manner based on the channel selection in the multiplexing mode, before the user equipment feeds back the ACK/NACK, the method further comprises:
if a number of bits of the ACK/NACK needed to be fed back by the user equipment exceeds N, then the user equipment carrying out a logic AND operation between codeword streams on the ACK/NACK of each downlink component carrier at first;
if the number of bits needed to be fed back still exceeds N after the logic AND operation between the codeword streams is carried out, then the user equipment carrying out a logic AND operation between component carriers on the ACK/NACK of each component carrier after the logic AND operation between the codeword streams is carried out.

3. The method as claimed in claim 2, wherein,
the value of N is 4 and the user equipment carries out the logic AND operation between the component carriers on specified component carriers according to a pre-engagement with the base station.

4. A method for feeding back an acknowledgement/negative-acknowledgement (ACK/NACK) on a physical uplink control channel, comprising:
sending, by a user equipment, the ACK/NACK by adopting a manner based on a channel selection or based on a Discrete Fourier Transform spread Orthogonal Frequency Division Multiplexing (DFT-s-OFDM) in a multiplexing mode according to a feedback rule in the multiplexing mode configured by a base station; wherein,
the user equipment determines to send the ACK/NACK by adopting the manner based on the channel selection or based on the DFT-s-OFDM in the multiplexing mode, according to capability of the user equipment feeding back ACK/NACK and/or the number of bits of the ACK/NACK needed to be fed back according to the feedback rule in the multiplexing mode configured by the base station; wherein,
the feedback rule in the multiplexing mode configured by the base station comprises:
if the user equipment is only able to support to feed back the ACK/NACK in the manner based on the channel selection, then the user equipment sending the ACK/NACK by adopting the manner based on the channel selection in the multiplexing mode;
if the user equipment is only able to support to feed back the ACK/NACK in the manner based on the DFT-s-OFDM, then the user equipment sending the ACK/NACK by adopting the manner based on the DFT-s-OFDM in the multiplexing mode;
if the user equipment is able to support to feed back the ACK/NACK not only in the manner based on the channel selection but also in the manner based on the DFT-s-OFDM, then the user equipment determining to send the ACK/NACK by adopting the manner based on the channel selection or based on the DFT-s-OFDM in the multiplexing mode according to the number of bits of the ACK/NACK needed to be fed back.

5. The method as claimed in claim 4, wherein,
the user equipment determining to send the ACK/NACK by adopting the manner based on the channel selection or based on the DFT-s-OFDM in the multiplexing mode according to the number of bits of the ACK/NACK needed to be fed back comprises:
when the number of bits of the ACK/NACK needed to be fed back by the user equipment does not exceed N, determining to send the ACK/NACK by adopting the manner based on the channel selection in the multiplexing mode;
when the number of bits of the ACK/NACK needed to be fed back by the user equipment exceeds N, determining to send the ACK/NACK by adopting the manner based on the DFT-s-OFDM in the multiplexing mode;
wherein, the value of N is 4.

6. The method as claimed in claim 5, wherein,
the number of bits of the ACK/NACK needed to be fed back by the user equipment is determined according to a downlink component carrier set configured by the base station for the user equipment;
or, is determined together according to a downlink component carrier set and a maximum value of codeword stream numbers contained in a downlink component carrier;
or, is determined according to a configured transmission mode of each downlink component carrier;
or, is determined according to a downlink control information type detected by the user equipment.

7. The method as claimed in claim 4, wherein,
the user equipment determining to send the ACK/NACK by adopting the manner based on the channel selection or based on the DFT-s-OFDM in the multiplexing mode according to the number of bits of the ACK/NACK needed to be fed back comprises:
when the number of bits of the ACK/NACK needed to be fed back by the user equipment does not exceed N, determining to send the ACK/NACK by adopting the manner based on the channel selection in the multiplexing mode;
when the number of bits of the ACK/NACK needed to be fed back by the user equipment exceeds N, determining to send the ACK/NACK by adopting the manner based on the DFT-s-OFDM in the multiplexing mode;
wherein, the value of N is 4.

8. A user equipment, comprising a feedback manner determination unit and an acknowledgement/negative-acknowledgement (ACK/NACK) feedback unit, wherein:
the feedback manner determination unit is configured to: determine to send an ACK/NACK by adopting a manner based on a channel selection or based on a Discrete Fourier Transform spread Orthogonal Frequency Division Multiplexing (DFT-s-OFDM) in a multiplexing mode according to a feedback manner in the multiplexing mode configured by a base station; and
the ACK/NACK feedback unit is configured to: send the ACK/NACK by adopting the manner based on the channel selection or based on the DFT-s-OFDM in the multiplexing mode; wherein,
the ACK/NACK feedback unit comprises a channel selection sending module and/or a DFT-s-OFDM sending module, and wherein:
the channel selection sending module is configured to: send the ACK/NACK by adopting the manner based on the channel selection; and
the DFT-s-OFDM sending module is configured to: send the ACK/NACK by adopting the manner based on the DFT-s-OFDM;

the channel selection sending module is further configured to carry out the following judgment and processing on the ACK/NACK needed to be fed back before sending the ACK/NACK:
when a number of bits of the ACK/NACK needed to be fed back exceeds N, then a logic AND operation between codeword streams is carried out on the ACK/NACK of each downlink component carrier at first; and
if the number of bits needed to be fed back still exceeds N after the logic AND operation between the codeword streams is carried out, then a logic AND operation between component carriers is carried out on the ACK/NACK of each component carrier after the logic AND operation between the codeword streams is carried out.

9. The user equipment as claimed in claim 8, wherein, the feedback manner determination unit is configured to: determine to send the ACK/NACK by adopting the manner based on the channel selection or based on the DFT-s-OFDM in the multiplexing mode according to an indication in a higher layer signaling received from the base station.

10. A user equipment, comprising a feedback manner determination unit and an acknowledgement/negative-acknowledgement (ACK/NACK) feedback unit, wherein:
the feedback manner determination unit is configured to: determine to send an ACK/NACK by adopting a manner based on a channel selection or based on a Discrete Fourier Transform spread Orthogonal Frequency Division Multiplexing (DFT-s-OFDM) in a multiplexing mode according to a feedback manner in the multiplexing mode configured by a base station; and
the ACK/NACK feedback unit is configured to: send the ACK/NACK by adopting the manner based on the channel selection or based on the DFT-s-OFDM in the multiplexing mode; wherein,
the feedback manner determination unit is configured to: determine to send the ACK/NACK by adopting the manner based on the channel selection or based on the DFT-s-OFDM in the multiplexing mode according to capability of the user equipment feeding back ACK/NACK and/or the number of bits of the ACK/NACK needed to be fed back according to the feedback rule in the multiplexing mode configured by the base station; wherein,
the feedback rule in the multiplexing mode configured by the base station comprises:
if the user equipment is only able to support to feed back the ACK/NACK in the manner based on the channel selection, then the user equipment sending the ACK/NACK by adopting the manner based on the channel selection in the multiplexing mode;
if the user equipment is only able to support to feed back the ACK/NACK in the manner based on the DFT-s-OFDM, then the user equipment sending the ACK/NACK by adopting the manner based on the DFT-s-OFDM in the multiplexing mode;
if the user equipment is able to support to feed back the ACK/NACK not only in the manner based on the channel selection but also in the manner based on the DFT-s-OFDM, then the user equipment determining to send the ACK/NACK by adopting the manner based on the channel selection or based on the DFT-s-OFDM in the multiplexing mode according to the number of bits of the ACK/NACK needed to be fed back.

11. The user equipment as claimed in claim 10, wherein, the feedback manner determination unit is configured to determine to send the ACK/NACK by adopting the manner based on the channel selection or based on the DFT-s-OFDM in the multiplexing mode according to the number of bits of the ACK/NACK needed to be fed back by the following manner:
when the number of bits of the ACK/NACK needed to be fed back by the user equipment does not exceed N, determining to send the ACK/NACK by adopting the manner based on the channel selection in the multiplexing mode; and
when the number of bits of the ACK/NACK needed to be fed back by the user equipment exceeds N, determining to send the ACK/NACK by adopting the manner based on the DFT-s-OFDM in the multiplexing mode;
wherein, a value of N is 4.

12. The user equipment as claimed in claim 11, wherein, the feedback manner determination unit is further configured to: determine the number of bits of the ACK/NACK needed to be fed back by the user equipment according to the following manner:
determine according to a downlink component carrier set configured by the base station for the user equipment;
or, determine together according to a downlink component carrier set and a maximum value of codeword stream numbers contained in a downlink component carrier;
or, determine according to a configured transmission mode of each downlink component carrier;
or, determine according to a downlink control information type detected by the user equipment.

13. A base station, comprising a feedback manner configuration unit or a feedback rule configuration unit, wherein,
the feedback manner configuration unit is configured to: configure a feedback manner in a multiplexing mode for a user equipment, and indicate the user equipment, through a higher layer signaling, to send an acknowledgement/negative-acknowledgement (ACK/NACK) by adopting a manner based on a channel selection or based on a Discrete Fourier Transform spread Orthogonal Frequency Division Multiplexing (DFT-s-OFDM) in the multiplexing mode; wherein the feedback manner configuration unit is configured to configure the feedback manner in the multiplexing mode for the user equipment according to the following manners:
if the user equipment is only able to support to feed back the ACK/NACK in the manner based on the channel selection, then indicating the user equipment to send the ACK/NACK by adopting the manner based on the channel selection in the multiplexing mode;
if the user equipment is only able to support to feed back the ACK/NACK in the manner based on the DFT-s-OFDM, then indicating the user equipment to send the ACK/NACK by adopting the manner based on the DFT-s-OFDM in the multiplexing mode;
if the user equipment is able to support to feed back the ACK/NACK not only in the manner based on the channel selection but also in the manner based on the DFT-s-OFDM, then indicating the user equipment to send the ACK/NACK by adopting the manner based on the channel selection or based on the DFT-s-OFDM;
the feedback rule configuration unit is configured to: configure a feedback rule in a multiplexing mode for a user equipment, and indicate the user equipment, to determine to send the ACK/NACK by adopting a manner based on a channel selection or based on a DFT-s-OFDM in the multiplexing mode according to capability of the user equipment feeding back ACK/NACK and/or the number of bits of the ACK/NACK needed to be fed back according to the feedback rule, wherein the feedback rule in the multiplexing mode configured by the feedback rule configuration unit for the user equipment comprises:

if the user equipment is only able to support to feed back the ACK/NACK in the manner based on the channel selection, then the user equipment sending the ACK/NACK by adopting the manner based on the channel selection in the multiplexing mode;

if the user equipment is only able to support to feed back the ACK/NACK in the manner based on the DFT-s-OFDM, then the user equipment sending the ACK/NACK by adopting the manner based on the DFT-s-OFDM in the multiplexing mode;

if the user equipment is able to support to feed back the ACK/NACK not only in the manner based on the channel selection but also in the manner based on the DFT-s-OFDM, then the user equipment determining to send the ACK/NACK by adopting the manner based on the channel selection or based on the DFT-s-OFDM in the multiplexing mode according to the number of bits of the ACK/NACK needed to be fed back.

* * * * *